United States Patent
Zivkovic

(10) Patent No.: US 11,850,808 B2
(45) Date of Patent: Dec. 26, 2023

(54) METHOD OF EVALUATING A COMPOSITE SAMPLE

(71) Applicant: ROLLS-ROYCE plc, London (GB)

(72) Inventor: Petar Zivkovic, Derby (GB)

(73) Assignee: ROLLS-ROYCE plc, London (GB)

( * ) Notice: Subject to any disclaimer, the term of this patent is extended or adjusted under 35 U.S.C. 154(b) by 1028 days.

(21) Appl. No.: 16/385,005

(22) Filed: Apr. 16, 2019

(65) Prior Publication Data
US 2019/0353599 A1   Nov. 21, 2019

(30) Foreign Application Priority Data
May 15, 2018  (GB) .................................... 1807839

(51) Int. Cl.
*B29C 70/30*  (2006.01)
*G01N 21/88*  (2006.01)
*G06T 7/00*  (2017.01)
*G01N 21/95*  (2006.01)

(52) U.S. Cl.
CPC ....... *B29C 70/302* (2021.05); *G01N 21/8851* (2013.01); *G01N 21/9515* (2013.01); *G06T 7/0002* (2013.01)

(58) Field of Classification Search
CPC .......... G01N 21/8851; G01N 21/9515; G01N 21/8803; G01N 21/956; G01N 21/93; G01N 2021/8472; G01N 29/30; B29C 70/302; B29C 70/30; B29C 66/97; B29C 65/82; B29C 65/8207; G06T 7/0002; G06T 7/0004; G06T 2207/10008; G06T 2207/10024; G06T 2207/30164; B32B 2041/04

USPC .......................................... 156/64, 378, 379
See application file for complete search history.

(56) References Cited

U.S. PATENT DOCUMENTS

| | | | | |
|---|---|---|---|---|
| 4,917,938 A * | 4/1990 | Mohan | ..................... | B32B 7/022 428/105 |
| 7,991,214 B1 * | 8/2011 | Choi | ..................... | G06T 7/0004 382/141 |
| 8,983,171 B2 * | 3/2015 | Toledano | ............... | G01N 21/95 382/141 |

(Continued)

OTHER PUBLICATIONS

Nov. 2, 2018 Search Report issued in British Patent Application No. 1807839.4.

*Primary Examiner* — John L Goff, II
(74) *Attorney, Agent, or Firm* — Oliff PLC

(57) ABSTRACT

A method of evaluating a composite sample comprises providing a flatbed scanner comprising a scanning head movable along a scanning direction; providing a composite sample comprising a plurality of plies arranged on planes parallel to a longitudinal direction and comprising a scanning plane containing ply edges, wherein the ply edges are oriented parallel to the longitudinal direction; arranging the composite sample on the flatbed scanner such that the scanning plane is parallel to the scanning direction and the ply edges of the scanning plane are perpendicular to the scanning direction; moving the scanning head along the scanning direction and perpendicularly to the ply edges to scan the scanning plane of the composite sample and obtain an image of the scanning plane; and evaluating the image to identify possible defects in the composite sample.

14 Claims, 7 Drawing Sheets

(56) References Cited

U.S. PATENT DOCUMENTS

| | | | |
|---|---|---|---|
| 2003/0053713 A1* | 3/2003 | Romanik | G06T 7/0004 |
| | | | 382/284 |
| 2005/0047643 A1 | 3/2005 | Lowe | |
| 2016/0102973 A1* | 4/2016 | Gonze | G01B 11/272 |
| | | | 356/138 |
| 2017/0151634 A1* | 6/2017 | Witney | G01N 29/04 |

* cited by examiner

METHOD OF EVALUATING A COMPOSITE SAMPLE

CROSS-REFERENCE TO RELATED APPLICATIONS

This specification is based upon and claims the benefit of priority from UK Patent Application Number 1807839.4 filed on 15 May 2018, the entire contents of which are incorporated herein by reference.

BACKGROUND

1. Field of the Disclosure

The present disclosure relates to composite materials and in particular to a method of evaluating a composite sample and a method of adjusting manufacturing condition to manufacture a composite component.

2. Description of the Related Art

Composite materials are increasingly used for components that require particular combinations of material properties. In particular, composite materials such as Carbon Fibre Reinforced Polymer (CFRP) are commonly used for components in the aerospace and other industries due to their high stiffness and low weight.

Composite materials tend to be constructed from reinforcing fibres (e.g. high strength or high stiffness fibres) laid up ply-by-ply into a laminate and the plies bonded together in a matrix, e.g. a resin. The resin may be injected into the preform in a process known as resin transfer moulding (RTM) or may already be present in the plies with the plies being supplied as a pre-impregnated or pre-preg material. The composite then goes through a series of further manufacturing processes including a heat cycle to cure the resin.

During the manufacturing processes, irregularities or defects may occur in the composite material, which may negatively affect the composite material properties and performances. Typical irregularities and defects in a composite material are fibre wrinkles, fibre waviness, misplaced plies, and voids in the matrix. Irregularities and defects may give rise to a failure of the composite material during testing. For example, a wrinkle exceeding a certain angle, or a void bigger in diameter than a maximum acceptable value may be considered defects.

There are known evaluating methods to detect defects in a composite material, such as for example visual inspection, ultrasonics, computed tomography (CT), and shearography.

By visual inspection, an operator can easily and quickly detect defects of relatively large dimension, but can't detect defects of relatively small dimensions because of the low resolution of human eye. So, even if very cheap, visual inspection is not typically used in evaluating composite materials.

Ultrasonics, computed tomography (CT), and shearography offer higher resolution, but at a lower speed and at a higher price, as the equipment is typically very expensive.

It is therefore an object of the present disclosure to provide an improved method of evaluating a composite sample, which provides high resolution, accurate information on the size, shape and type of the defect, and is easy and inexpensive to carry out.

SUMMARY

According to a first aspect, there is provided a method of evaluating a composite sample comprising: providing a flatbed scanner comprising a scanning head movable along a scanning direction; providing a composite sample comprising a plurality of plies arranged on planes parallel to a longitudinal direction and comprising a scanning plane containing ply edges, wherein the ply edges are oriented parallel to the longitudinal direction; arranging the composite sample on the flatbed scanner such that the scanning plane is parallel to the scanning direction and the ply edges of the scanning plane are perpendicular to the scanning direction; moving the scanning head along the scanning direction and perpendicularly to the ply edges to scan the scanning plane of the composite sample and obtain an image of the scanning plane; and evaluating the image to identify possible defects in the composite sample.

By using a conventional high-resolution flatbed scanner and positioning the composite sample in a correct orientation, i.e. with the scanning plane parallel to the scanning direction and the ply edges of the scanning plane perpendicular to the scanning direction, it is possible to achieve a very high detailed image of the composite sample and its defects, which allows a quick and simple evaluation of the composite sample. In practice, the method is only limited by the size of the scanner and the samples.

Evaluating the image to identify possible defects in the composite sample may comprise identifying any one of voids, fibre wrinkles and fibre waviness on the image. The evaluating step may be performed visually by an operator.

The method may comprise electronically post-processing the image. Electronically post-processing the image may improve evaluating the image, for example enlarging the image may help with identifying a larger number of defects.

The method may comprise false colouring the image to enhance identifying any one of plies, voids, fibre wrinkles and fibre waviness. For example, by false colouring the image it is possible to identify which ply is at which point in the laminate, and/or voids which may come up as sharp dark regions, and/or waviness and wrinkling which may have the highest impact (knock down factor) within a composite laminate.

Providing a composite sample may comprise machining a composite component to achieve the scanning plane of the composite sample.

For example, the composite component may be any one of a fan blade, fan casing, and drive shaft of an aeroengine.

The method may further comprise, subsequent to scanning the scanning plane: testing the composite sample; identifying possible failures of the composite sample; and correlating said possible failures to the possible defects identified in the composite sample.

Alternatively, the method may comprise, before providing a composite sample: testing a composite component; identifying possible failures of the composite component; and wherein providing a composite sample comprises machining the composite component tested in the testing step to achieve the composite sample with the scanning plane; and after evaluating the image to identify possible defects in the composite sample, correlating said possible failures of the composite component with the possible defects of the composite sample.

In substance, it is possible either to first scanning the composite sample to obtain the image and then testing the sample, or first testing the composite sample and then scanning the tested sample. In both cases, a precise correlation between possible defects/irregularities and possible failures may be obtained. Such correlation may provide information on the number and/or dimensions of defects/irregularities that do not give rise to failures and that can therefore be tolerated. Knowing such information may spare the time to test further samples or components, if the number or dimensions of the defects/irregularities evaluated in the further sample or component exceeds a threshold value.

Moreover, the method may comprise: providing at least a first and a second composite component obtained in a manufacturing process at same manufacturing conditions; testing the first composite component to identify possible failures; machining the second composite component to achieve providing the composite sample with the scanning plane; and correlating the possible failures of the first composite component to the possible defects identified on the image of the composite sample machined out from the second composite component.

By providing a first and a second composite component obtained in a manufacturing process at the same manufacturing conditions, it is assumed that the first and second composite components are substantially the same, i.e. they present the same defects/irregularities, such that a correlation may be established between the failure(s) in the composite component and the defect(s)/irregularity(ies) of the non-tested sample.

According to a second aspect, there is provided a method of adjusting manufacturing conditions to manufacture a composite component comprising the following steps: a) providing a flatbed scanner comprising a scanning head movable along a scanning direction; b) manufacturing a testing composite component at manufacturing conditions; c) providing a composite sample obtained from said testing composite component, comprising a plurality of plies arranged on planes parallel to a longitudinal direction and comprising a scanning plane containing ply edges, the ply edges being oriented parallel to the longitudinal direction; d) arranging the composite sample on the flatbed scanner such that the scanning plane is parallel to the scanning direction and the ply edges of the scanning plane are perpendicular to the scanning direction; e) moving the scanning head along the scanning direction and perpendicularly to the ply edges to scan the scanning plane of the composite sample and obtain an image of the scanning plane; f) evaluating the image to identify possible defects in the composite sample; and if defects are above an acceptable threshold, manufacturing a further testing composite component at changed manufacturing conditions and repeating steps c) to f) until defects are equal or below the acceptable threshold or absent; or if defects are equal or below the acceptable threshold or absent, manufacturing the composite component at the manufacturing conditions that provide defects below the acceptable threshold or absence of defects in the composite sample.

The method according to the second aspect may allow to optimise the manufacturing conditions so as to manufacture a composite component without defects.

The testing composite component and the composite components may be any one of a fan blade, a fan casing and drive shaft of an aeroengine.

In the method of the second aspect, manufacturing the composite component and the testing composite component may comprise: laying up a plurality of plies to obtain a preformed composite component and a preformed testing composite component, respectively; and curing the preformed composite component and the preformed testing composite component. The manufacturing conditions may comprise temperature and/or pressure at curing, and/or ply orientation.

The acceptable threshold may be determined in a preliminary phase comprising: providing a plurality of further composite samples, each comprising a plurality of plies arranged on planes parallel to a longitudinal direction and featuring a scanning plane containing ply edges, wherein the ply edges are oriented parallel to the longitudinal direction; arranging the further composite samples on the flatbed scanner such that the scanning plane is parallel to the scanning direction and the ply edges of the scanning plane are perpendicular to the scanning direction; moving the scanning head along the scanning direction and perpendicularly to the ply edges to scan the scanning plane of the further composite samples and obtain for each further composite sample an image of the scanning plane; evaluating said image to identify possible defects in the further composite samples; testing the plurality of further composite samples; identifying possible failures of the further composite samples; correlating said possible failures to the possible defects identified in the further composite samples; and defining the acceptable threshold as a maximum number of defects in the further composite sample that do not give rise to failures.

Alternatively, the acceptable threshold may be determined in a preliminary phase comprising: providing a plurality of further testing composite components; testing the plurality of further testing composite components; identifying possible failures of the further testing composite components; and subsequently machining the further testing composite components to achieve a plurality of further composite samples, each comprising a plurality of plies arranged on planes parallel to a longitudinal direction and featuring a scanning plane comprising ply edges, wherein the ply edges are oriented parallel to the longitudinal direction; arranging the further composite samples on the flatbed scanner such that the scanning plane is parallel to the scanning direction and the ply edges of the scanning plane are perpendicular to the scanning direction; moving the scanning head along the scanning direction and perpendicularly to the ply edges to scan the scanning plane of the further composite samples and obtain for each further composite sample an image of the scanning plane; evaluating the image to identify possible defects in the further composite sample; correlating the possible failures of each further testing composite components to the possible defects identified in each further composite sample machined out from a respective further testing composite components; and defining the acceptable threshold as a maximum number of possible defects in the further composite sample that did not give rise to failures in the respective further testing composite components.

The further testing composite components are any one of a fan blade, a fan casing and drive shaft of an aeroengine.

As noted elsewhere herein, the present disclosure may relate to an aeroengine. An example of aeroengine is a gas turbine engine. A gas turbine engine generally comprises, in axial flow series, an air intake, a fan with a plurality of radially arranged fan blades rotating within a fan casing, one or more compressors, a combustor, one or more turbines, and an exhaust nozzle. Air entering the air intake is accelerated by the fan to produce two air flows: a first air flow (core engine flow) into compressor and a second air flow (bypass flow) which passes through a bypass duct to provide propulsive thrust. Air entering the compressor is compressed, mixed with fuel and then fed into the combustor, where combustion of the air/fuel mixture occurs. The high temperature and high energy exhaust fluids are then fed to the turbine, where the energy of the fluids is converted to mechanical energy to drive the compressor in rotation by suitable interconnecting shaft.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
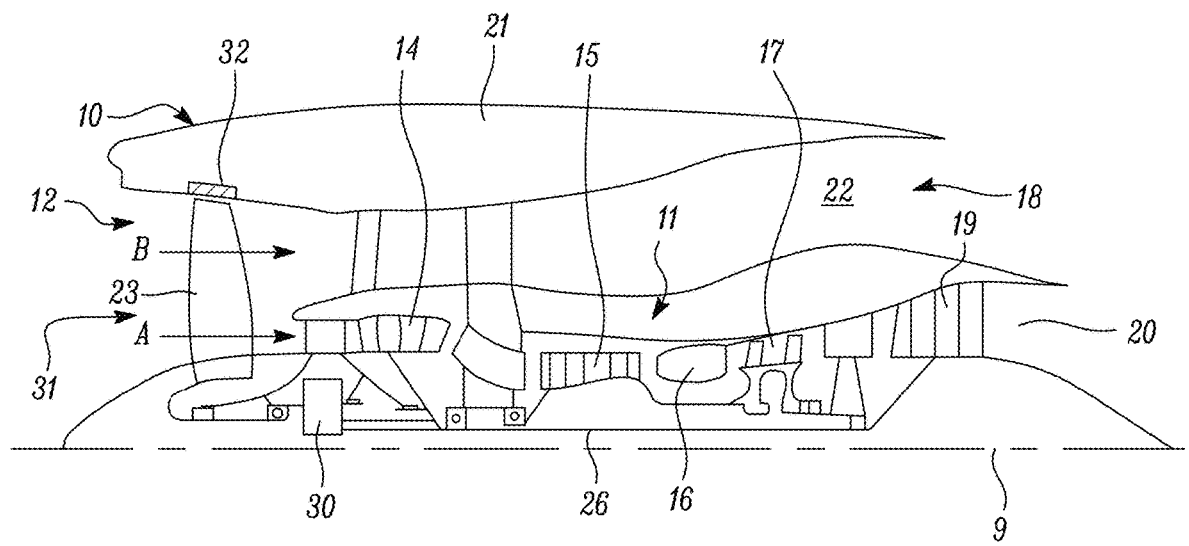
FIG. 1 is a sectional side view of a gas turbine engine.

FIG. 1 illustrates a gas turbine engine 10 having a principal rotational axis 9. The engine 10 comprises an air intake 12 and a propulsive fan 31 comprising a plurality of radially arranged fan blades 23 rotating within a fan casing 32. The fan 31 generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 31 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 31 generally provides the majority of the propulsive thrust. The epicyclic gearbox 30 is a reduction gearbox.

Figure 3:
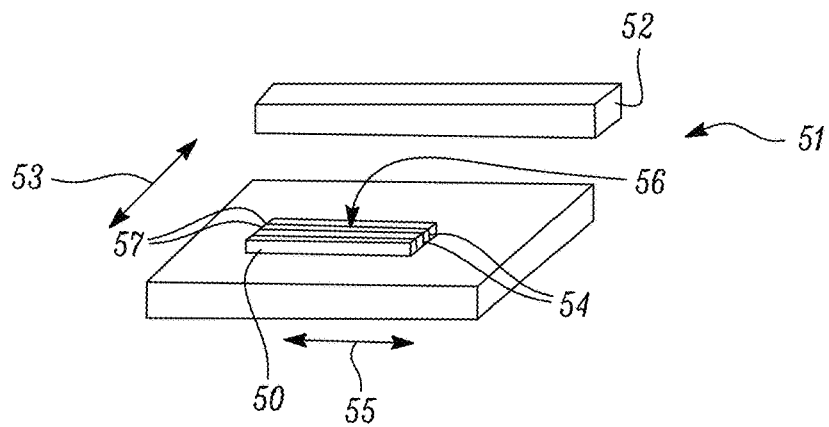
FIG. 3 is an isometric view of an arrangement of a flatbed scanner with a composite sample.
Figure 4:
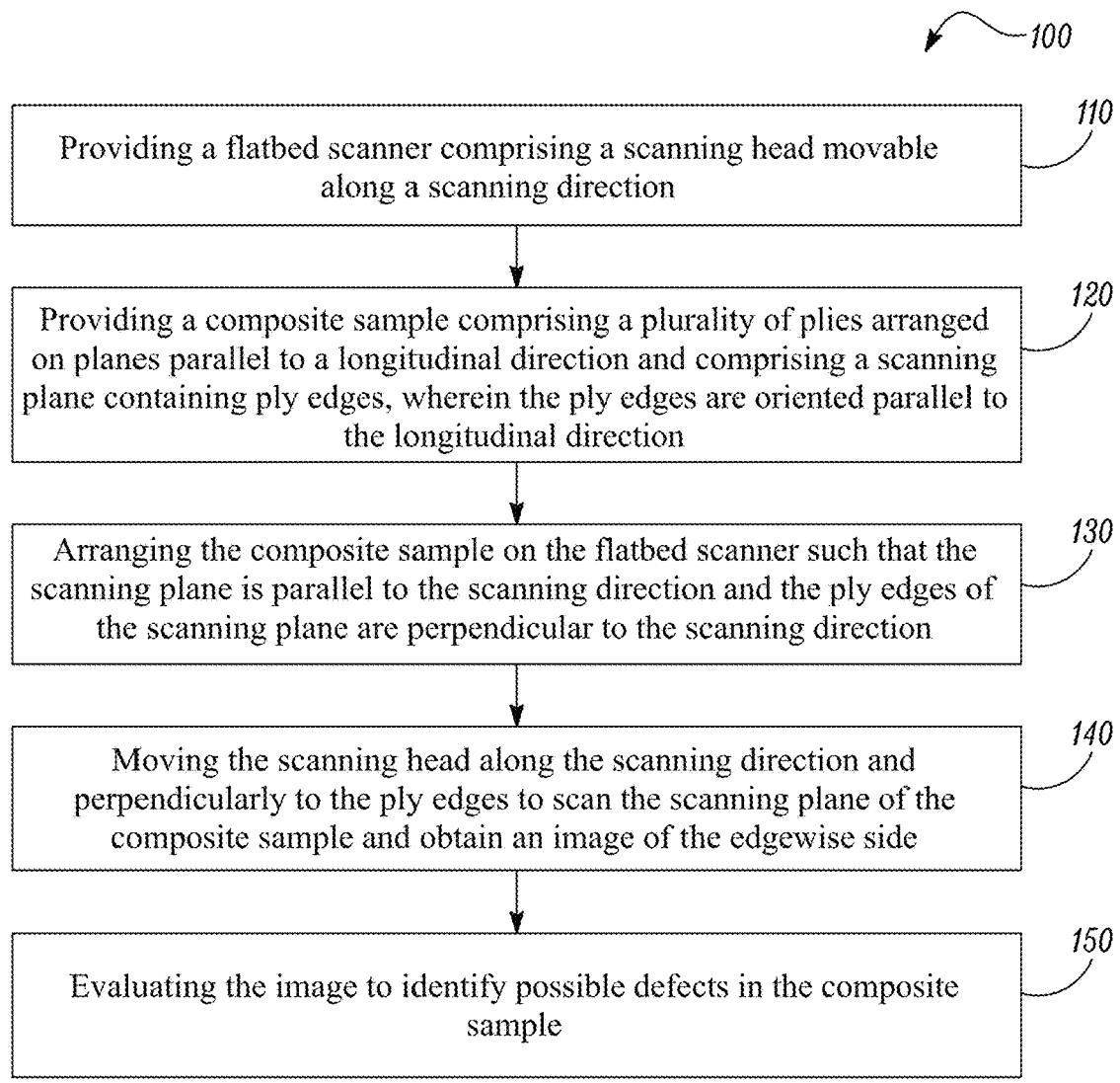
FIG. 4 is a flow diagram of a method of evaluating a composite sample according to a first aspect of the disclosure.

A method 100 of evaluating a composite sample 50 according to a first aspect of the disclosure will be now described with reference to FIGS. 3 and 4.

The method comprises at 110 providing a flatbed scanner 51 comprising a scanning head 52 movable along a scanning direction 53. The flatbed scanner may be a conventional high-resolution A3 flatbed scanner.

The method further comprises at 120 providing the composite sample 50 comprising a plurality of plies 54 arranged on planes parallel to a longitudinal direction 55 and comprising a scanning plane 56 containing ply edges 57, wherein the ply edges 57 are oriented parallel to the longitudinal direction 55. According to the method, at 130, the composite sample 50 is arranged on the flatbed scanner 51 such that the scanning plane 56 is parallel to the scanning direction 53 and the ply edges 57 of the scanning plane 56 are perpendicular to the scanning direction 53.

Figure 2:
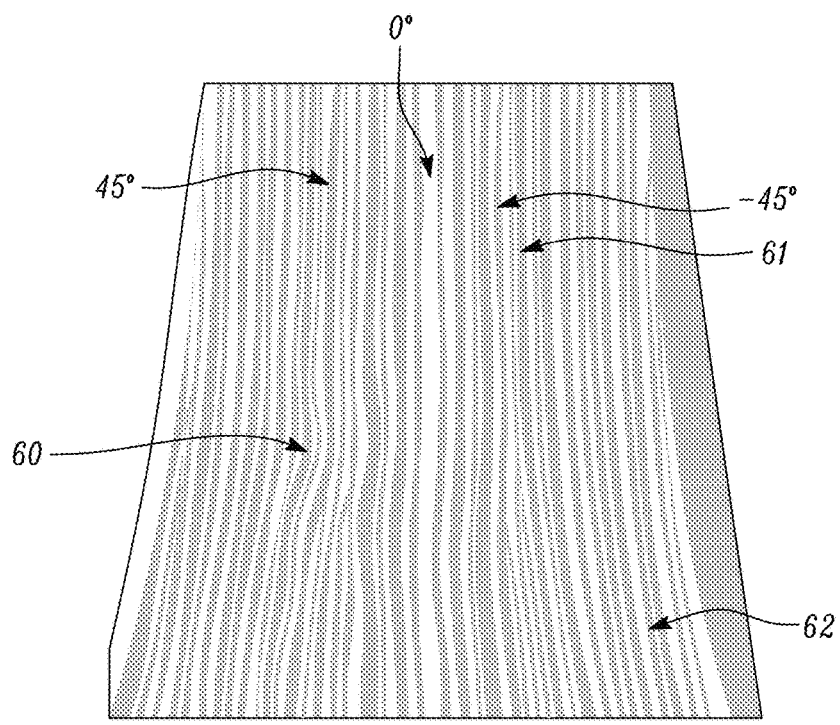
FIG. 2 is an image obtained by a method according to a first aspect of the disclosure.

Once the composite sample 50 is arranged on the flatbed scanner 50, the method comprises at 140 moving the scanning head 52 along the scanning direction 53 and perpendicularly to the ply edges 57 to scan the scanning plane 56 of the composite sample 50 and obtain an image of the scanning plane 56, an example of which is shown in FIG. 2.

The method further comprises at 150 evaluating the image to identify possible defects in the composite sample 50.

Providing the composite sample 50 in the above described arrangement relative to the scanning head 52 (and therefore relative to the scanning direction 53) allows to obtain high quality images, which may reveal irregularities and defects in the composite sample 50, in particular in the scanning plane 56, which may not be detected with other methods.

As an example, FIG. 2 is an image of a composite sample obtained from a composite fan blade of an aeroengine. In the image of FIG. 2, it is possible to identify very precisely fibre wrinkles 60, fibre waviness 61 and voids 62 in the plies 54. It is further possible to identify plies 54 with different orientation. In other words, it is possible to link a defect to a specific ply. Information on possible defects in the composite sample may be of utmost importance when producing composite components, as it will be illustrated further below.

To enhance detecting defects and irregularities, the image may be electronically post-processed, for example enlarged or false coloured. The evaluation step may be carried out either visually by an operator or in a completely automated way by an image processing program.

The scanning plane 56 of the composite sample 50 may be obtained by machining, or any other suitable technique, a composite component. For example, the composite component may be a fan blade (as illustrated in FIG. 2), a fan casing or a drive shaft of an aeroengine.

Figure 5:
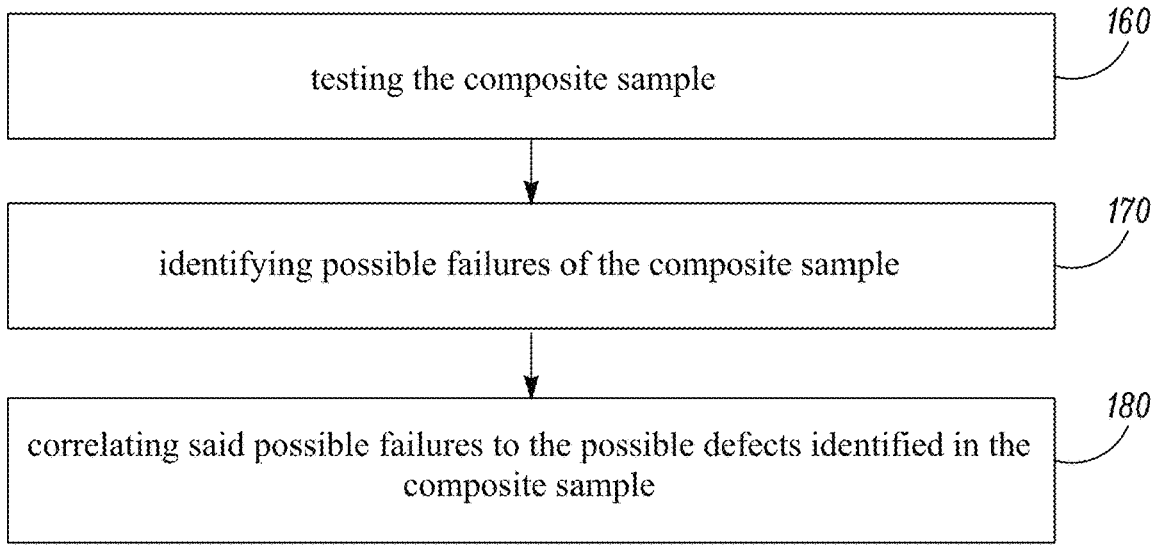
FIG. 5 is a flow diagram showing additional steps of the method according to the first aspect.

With reference to FIG. 5, the method 100 may further comprise at 160 testing the composite sample 50 that has been scanned at 140 and at 170 identifying possible failures in the composite sample 50. For example, the composite sample 50 may be mechanically tested according to standard test methods known to the person skilled in the art.

Furthermore, the method may comprise at 180 correlating the possible failures to the possible defects identified in the composite sample 50. The method allows to gather more information and a better understanding of composite materials over the known methods.

Alternatively, it is possible to first test the composite component, subsequently provide the composite sample 50 from the tested composite component, and then scan the composite sample 50.

Figure 6:
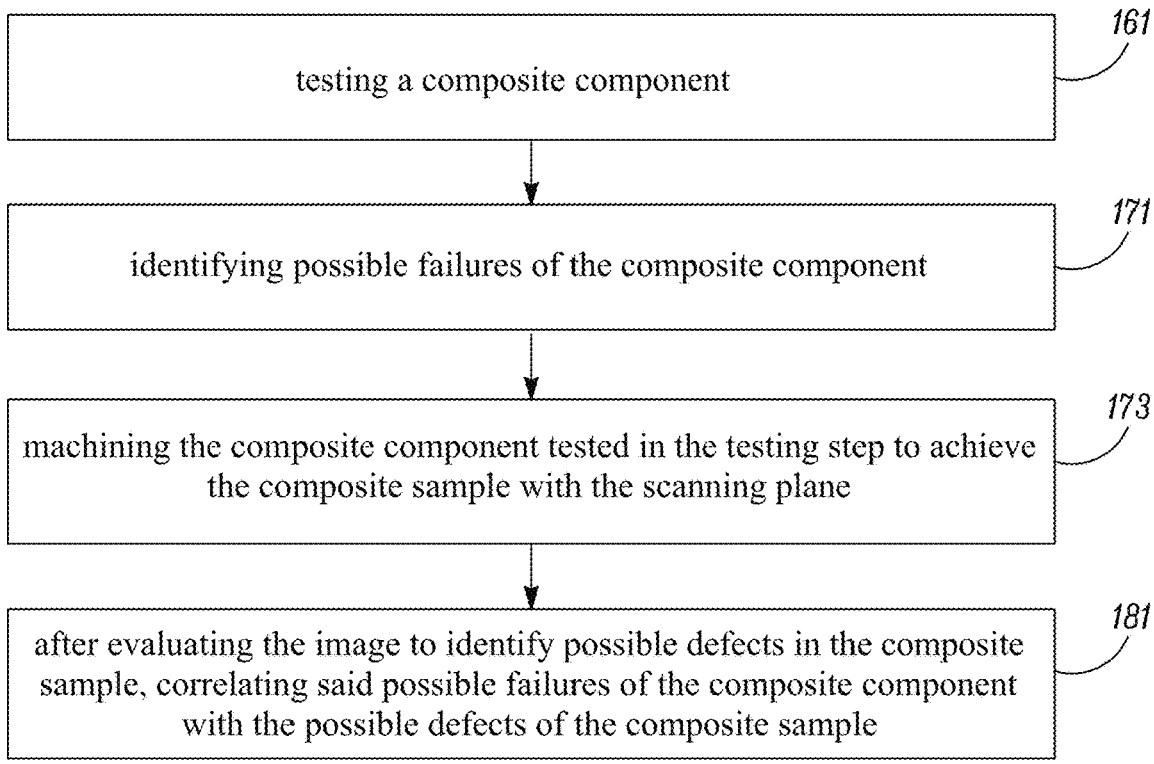
FIG. 6 is a flow diagram showing additional steps of the method according to the first aspect, alternative to those of FIG. 5.

In detail, with reference to FIG. 6, the method may comprise at 161 testing a composite component and at 171 identifying possible failures of the composite component. For example, the composite component may be mechanically tested according to standard test methods known to the person skilled in the art. Once tested, the composite component is machined at 173 to provide the composite sample 50 with the scanning plane 56 according to step 120.

After evaluating the image to identify possible defects in the composite sample according to step 150, the method may further comprise at 181 correlating the possible failures of the composite component with the possible defects of the composite sample 50.

In a further embodiment, it is possible to provide two similar composite components, i.e. components manufactured in the same way, so that one component is tested, the other component is scanned. The two similar composite component may feature substantially the same characteristics and properties, including possible defects.

Figure 7:
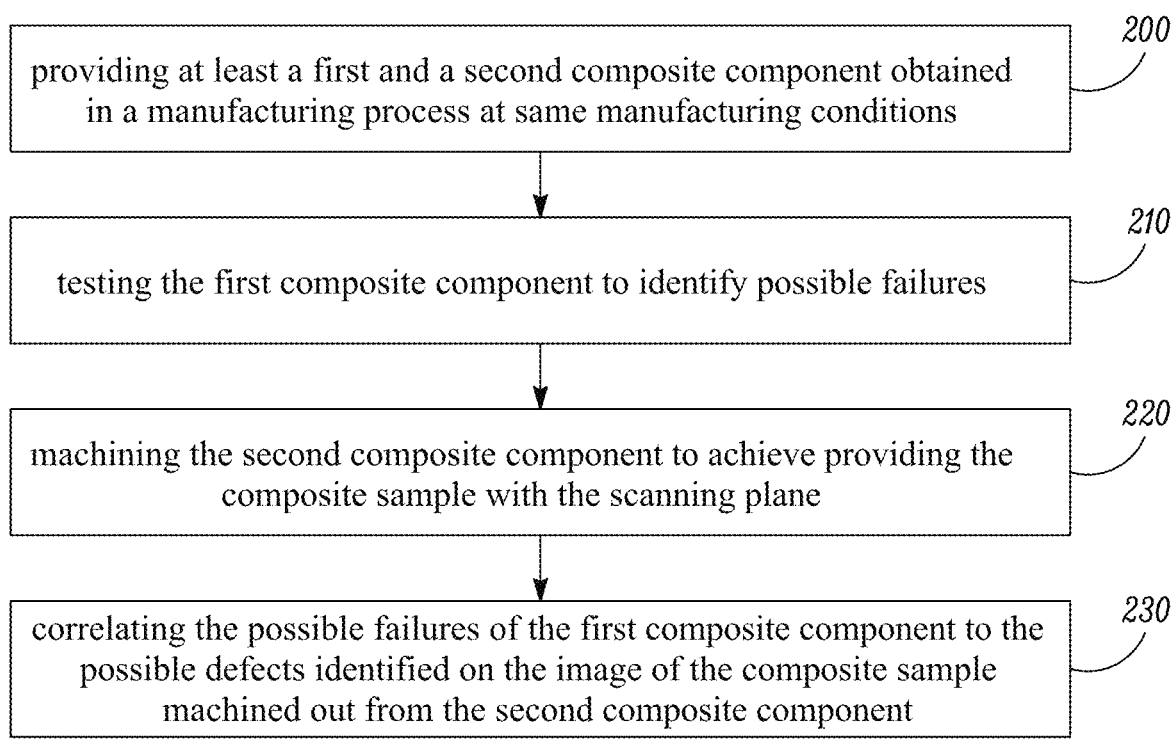
FIG. 7 is a flow diagram showing additional steps of the method according to the first aspect, alternative to those of FIGS. 5 and 6.

In detail, with reference to FIG. 7, the method may comprise at 200 providing at least a first and a second composite component obtained in a manufacturing process at same manufacturing conditions; at 210 testing the first composite component to identify possible failures; at 220 machining the second composite component to achieve providing the composite sample 50 with the scanning plane 56 according to step 120; and at 203 correlating the possible failures of the first composite component to the possible defects identified on the image of the composite sample 50 machined out from the second composite component.

Figure 8:
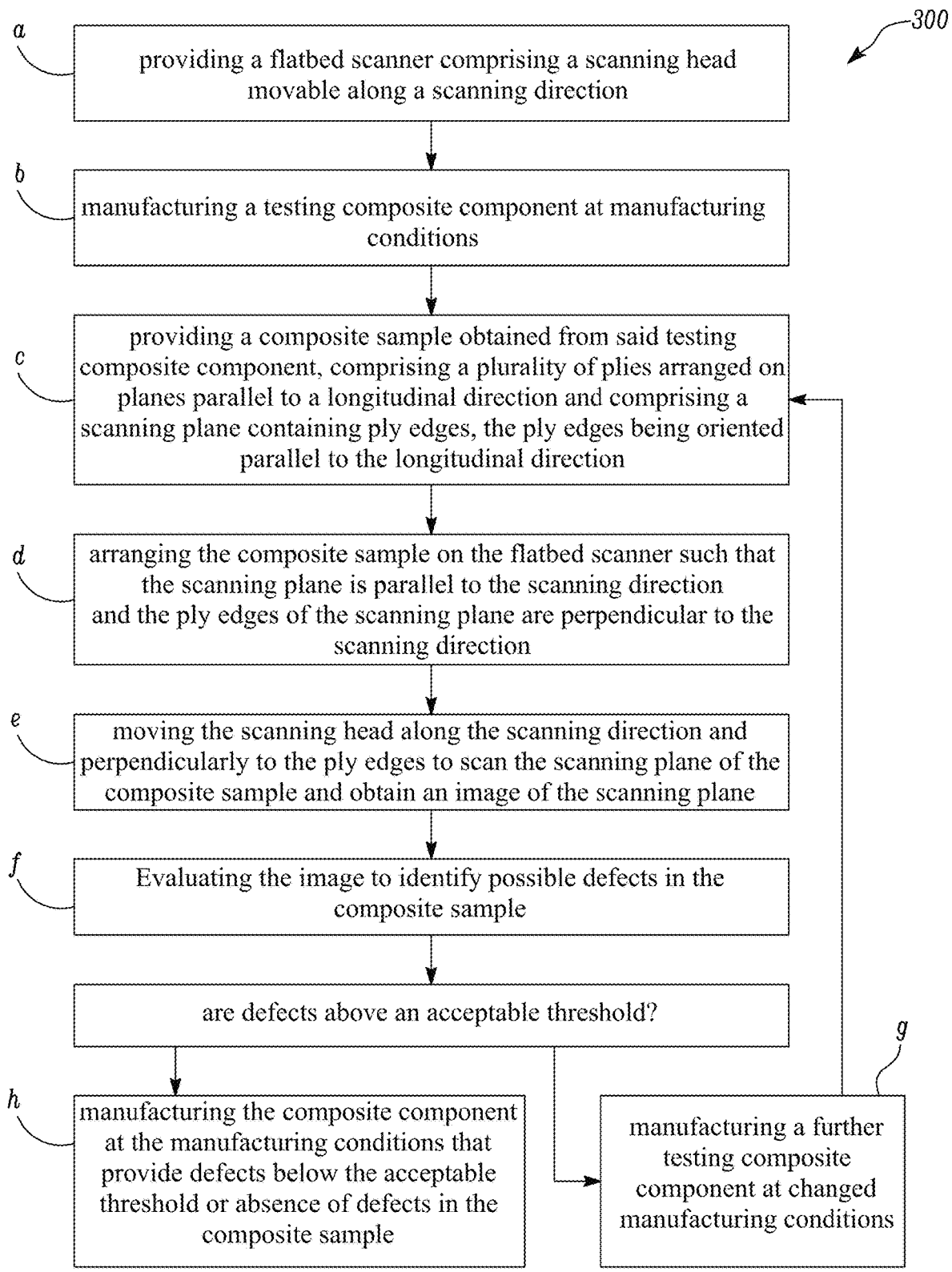
FIG. 8 is a flow diagram of a method of evaluating a composite sample according to a second aspect of the disclosure.

A method 300 of adjusting manufacturing conditions to manufacture a composite component according to a second aspect of the disclosure will be now described with reference to FIGS. 3 and 8. The method comprises the following steps:

a) providing a flatbed scanner 51 comprising a scanning head 52 movable along a scanning direction 53;

b) manufacturing a testing composite component at manufacturing conditions;

c) providing a composite sample 50 obtained from said testing composite component, comprising a plurality of plies 54 arranged on planes parallel to a longitudinal direction 55 and comprising a scanning plane 56 containing ply edges 57, the ply edges 57 being oriented parallel to the longitudinal direction 55;

d) arranging the composite sample 50 on the flatbed scanner 51 such that the scanning plane 56 is parallel to the scanning direction 53 and the ply edges 57 of the scanning plane 56 are perpendicular to the scanning direction 53;

e) moving the scanning head 52 along the scanning direction 53 and perpendicularly to the ply edges 57 to scan the scanning plane 56 of the composite sample 50 and obtain an image of the scanning plane 56;

f) evaluating the image to identify possible defects in the composite sample 50.

As a consequence of step f), if defects are above an acceptable threshold, the method 300 further comprises a step g) of manufacturing a further testing composite component at changed manufacturing conditions and repeating steps c) to f) until defects are equal or below the acceptable threshold or absent; alternatively, if defects are equal or below the acceptable threshold or absent, the method 300 further comprises a step h) of manufacturing the composite component at the manufacturing conditions that provide defects below the acceptable threshold or absence of defects in the composite sample 50.

In substance, with the method according to the second aspect, it is possible to optimise the manufacturing conditions of a composite component manufacturing process, by precisely correlating defects to the manufacturing conditions of the composite component.

The acceptable threshold may be determined in a preliminary phase wherein possible defects/irregularities in a composite sample are detected and subsequently the same composite sample is tested for possible failures, so that the possible defects/irregularities can be correlated to the possible failures.

Figure 9:
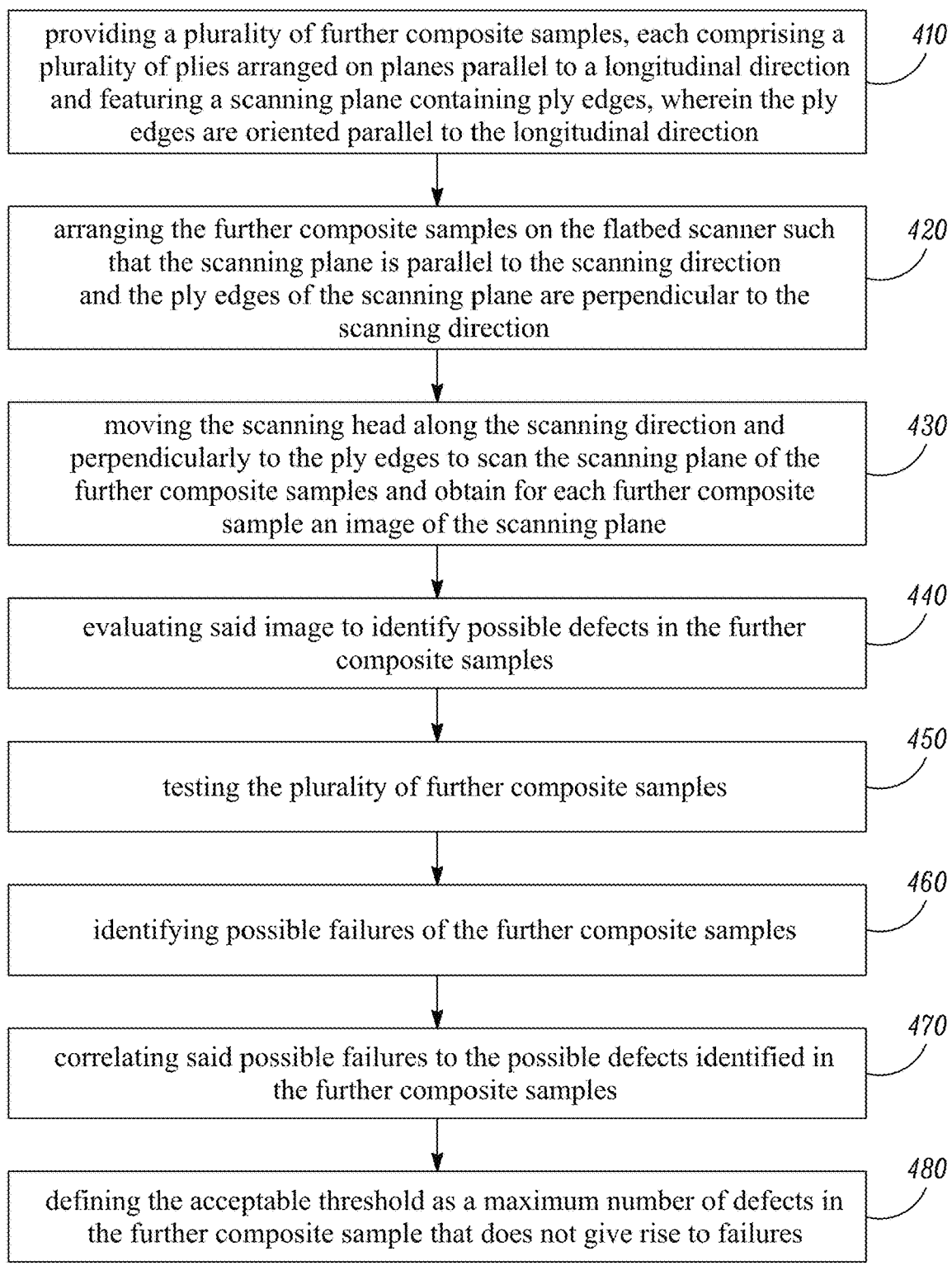
FIG. 9 is a flow diagram showing additional steps of the method according to the second aspect.

More in detail, with reference to FIG. 9, the preliminary phase may comprise at 410 providing a plurality of further composite samples, each comprising a plurality of plies 54 arranged on planes parallel to a longitudinal direction 55 and featuring a scanning plane 56 containing ply edges 57, wherein the ply edges 57 are oriented parallel to the longitudinal direction 55; at 420 arranging the further composite samples on the flatbed scanner 51 such that the scanning plane 56 is parallel to the scanning direction 53 and the ply edges 57 of the scanning plane 56 are perpendicular to the scanning direction 53; at 430 moving the scanning head 52 along the scanning direction 53 and perpendicularly to the ply edges 57 to scan the scanning plane 56 of the further composite samples and obtain for each further composite sample an image of the scanning plane 56; at 440 evaluating the image to identify possible defects in the further composite samples; at 450 testing the plurality of further composite samples; at 460 identifying possible failures of the further composite samples; at 470 correlating the possible failures to the possible defects identified in the further composite samples; and at 480 defining the acceptable threshold as a maximum number of defects in the further composite sample that does not give rise to failures.

Alternatively, the acceptable threshold may be determined in a preliminary phase wherein further testing composite components are first tested, then machined to obtain further composite samples that are in turned scanned to be evaluated.

Figure 10:
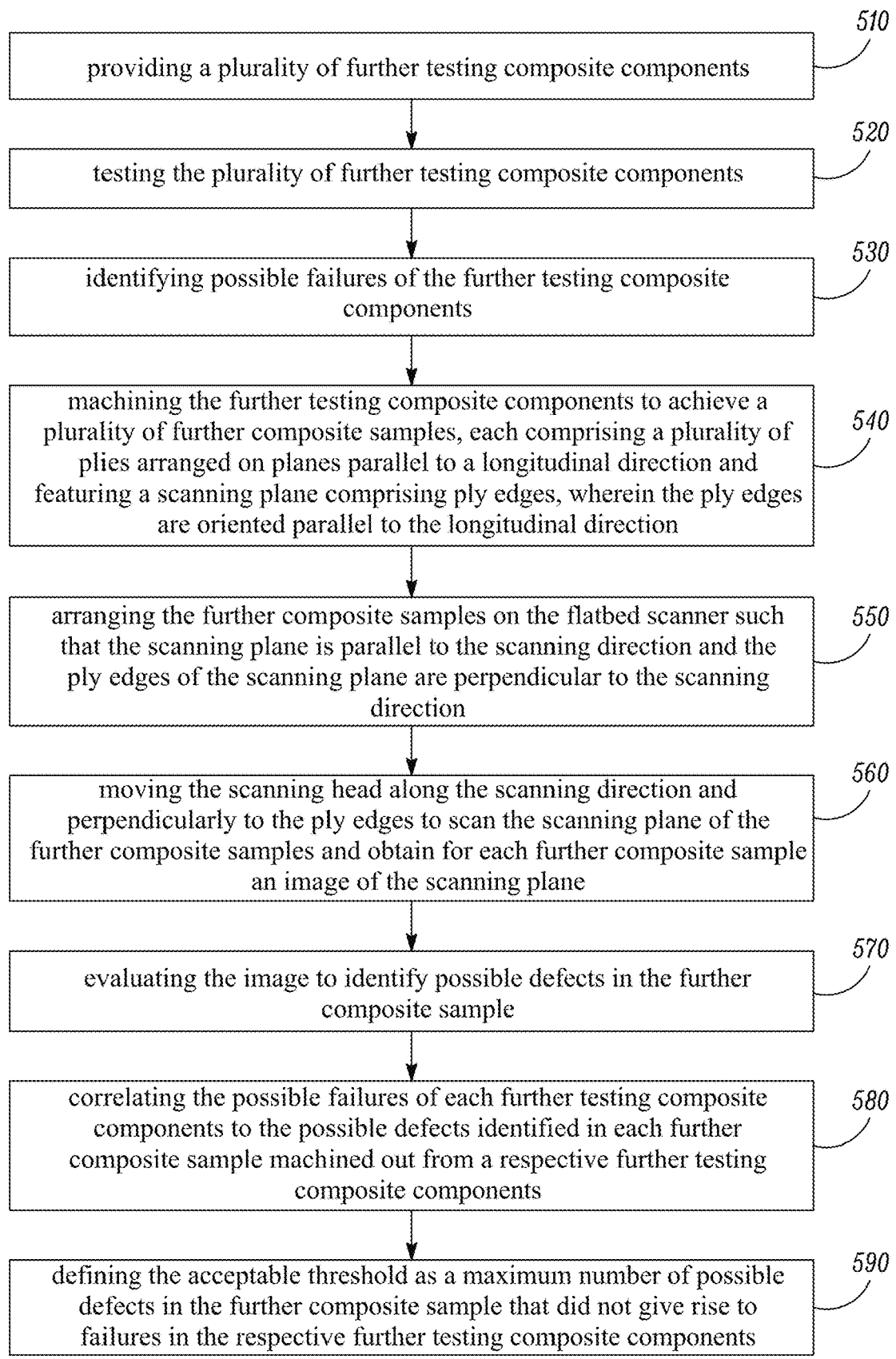
FIG. 10 is a flow diagram showing additional steps of the method according to the second aspect, alternative to those of FIG. 9.

In detail, with reference to FIG. 10, the preliminary phase may comprise at 510 providing a plurality of further testing composite components; at 520 testing the plurality of further testing composite components; at 530 identifying possible failures of the further testing composite components; and subsequently at 540 machining the further testing composite components to achieve a plurality of further composite samples, each comprising a plurality of plies arranged on planes parallel to a longitudinal direction and featuring a scanning plane comprising ply edges, wherein the ply edges are oriented parallel to the longitudinal direction; at 550 arranging the further composite samples on the flatbed scanner such that the scanning plane is parallel to the scanning direction and the ply edges of the scanning plane are perpendicular to the scanning direction; at 560 moving the scanning head along the scanning direction and perpendicularly to the ply edges to scan the scanning plane of the further composite samples and obtain for each further composite sample an image of the scanning plane; at 570 evaluating the image to identify possible defects in the further composite sample; at 580 correlating the possible failures of each further testing composite components to the possible defects identified in each further composite sample machined out from a respective further testing composite components; and at 590 defining the acceptable threshold as a maximum number of possible defects in the further composite sample that did not give rise to failures in the respective further testing composite components.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A method of evaluating a composite sample comprising:
    providing a flatbed scanner comprising a scanning head movable along a scanning direction;
    providing a composite sample comprising a plurality of plies arranged only on a flatbed surface of the flatbed scanner along planes parallel to a longitudinal direction and comprising a scanning plane containing ply edges, wherein the ply edges extend along a longest dimension of the plies and are oriented parallel to the longitudinal direction and parallel to the flatbed surface supporting the plies, the entire flatbed surface being parallel to the scanning direction;
    arranging the composite sample on the flatbed scanner such that the scanning plane is parallel to the scanning direction and the ply edges of the scanning plane are perpendicular to the scanning direction, wherein the composite sample is disposed between the scanning head and the flatbed surface along a direction perpendicular to both the scanning direction and the longitudinal direction;
    moving the scanning head along the scanning direction and perpendicularly to the ply edges to scan the scanning plane of the composite sample and obtain an image of the scanning plane; and
    evaluating the image to identify possible defects in the composite sample.

2. The method according to claim 1, wherein evaluating the image to identify possible defects in the composite sample comprises identifying any one of voids, fibre wrinkles and fibre waviness on the image.

3. The method according to claim 1, comprising false colouring the image to enhance identifying any one of plies, voids, fibre wrinkles and fibre waviness.

4. The method according to claim 3, wherein providing a composite sample comprises machining a composite component to achieve the scanning plane of the composite sample.

5. The method according to claim 4, wherein the composite component is any one of a fan blade, fan casing, and drive shaft of an aeroengine.

6. The method according to claim 1, comprising, subsequent to scanning the scanning plane:
    testing the composite sample;
    identifying possible failures of the composite sample; and
    correlating said possible failures to the possible defects identified in the composite sample.

7. The method according to claim 1, comprising, before providing a composite sample:
    testing a composite component;
    identifying possible failures of the composite component; and wherein providing a composite sample comprises machining the composite component tested in the testing step to achieve the composite sample with the scanning plane; and
    after evaluating the image to identify possible defects in the composite sample, correlating said possible failures of the composite component with the possible defects of the composite sample.

8. The method according to claim 1, comprising:
    providing at least a first and a second composite component obtained in a manufacturing process at same manufacturing conditions;
    testing the first composite component to identify possible failures;
    machining the second composite component to achieve providing the composite sample with the scanning plane; and
    correlating the possible failures of the first composite component to the possible defects identified on the image of the composite sample machined out from the second composite component.

9. A method of adjusting manufacturing conditions to manufacture a composite component comprising the following steps:
    a) providing a flatbed scanner comprising a scanning head movable along a scanning direction;
    b) manufacturing a testing composite component at manufacturing conditions;
    c) providing a composite sample obtained from said testing composite component, comprising a plurality of plies arranged only on a flatbed surface of the flatbed scanner along planes parallel to a longitudinal direction and comprising a scanning plane containing ply edges, the ply edges extending along a longest dimension of the plies and being oriented parallel to the longitudinal direction and parallel to the flatbed surface supporting the plies, the entire flatbed surface being parallel to the scanning direction;
    d) arranging the composite sample on the flatbed scanner such that the scanning plane is parallel to the scanning direction and the ply edges of the scanning plane are perpendicular to the scanning direction, wherein the composite sample is disposed between the scanning head and the flatbed surface along a direction perpendicular to both the scanning direction and the longitudinal direction;
    e) moving the scanning head along the scanning direction and perpendicularly to the ply edges to scan the scanning plane of the composite sample and obtain an image of the scanning plane;
    f) evaluating the image to identify possible defects in the composite sample; and
    if defects are above an acceptable threshold, g) manufacturing a further testing composite component at changed manufacturing conditions and repeating steps c) to f) until defects are equal or below the acceptable threshold or absent; or
    if defects are equal or below the acceptable threshold or absent, h) manufacturing the composite component at the manufacturing conditions that provide defects below the acceptable threshold or absence of defects in the composite sample.

10. The method according to claim 9, wherein manufacturing the composite component and the testing composite component comprises:
    laying up a plurality of plies to obtain a preformed composite component and a preformed testing composite component, respectively; and
    curing the preformed composite component and the preformed testing composite component; and wherein the manufacturing conditions comprise temperature and/or pressure at curing, and/or ply orientation.

11. The method according to claim 9, wherein the acceptable threshold is determined in a preliminary phase comprising:
- providing a plurality of further composite samples, each comprising a plurality of plies arranged on planes parallel to a longitudinal direction and featuring a scanning plane containing ply edges, wherein the ply edges are oriented parallel to the longitudinal direction;
- arranging the further composite samples on the flatbed scanner such that the scanning plane is parallel to the scanning direction and the ply edges of the scanning plane are perpendicular to the scanning direction;
- moving the scanning head along the scanning direction and perpendicularly to the ply edges to scan the scanning plane of the further composite samples and obtain for each further composite sample an image of the scanning plane;
- evaluating each image to identify possible defects in the further composite samples;
- testing the plurality of further composite samples;
- identifying possible failures of the further composite samples;
- correlating said possible failures to the possible defects identified in the further composite samples; and
- defining the acceptable threshold as a maximum number of defects in the further composite samples that does not give rise to failures.

12. The method according to claim 9, wherein the testing composite component and the composite component are any one of a fan blade, a fan casing and drive shaft of an aeroengine.

13. The method according to claim 9, wherein the acceptable threshold is determined in a preliminary phase comprising:
- providing a plurality of further testing composite components;
- testing the plurality of further testing composite components;
- identifying possible failures of the further testing composite components; and subsequently
- machining the further testing composite components to achieve a plurality of further composite samples, each comprising a plurality of plies arranged on planes parallel to a longitudinal direction and featuring a scanning plane comprising ply edges, wherein the ply edges are oriented parallel to the longitudinal direction;
- arranging the further composite samples on the flatbed scanner such that the scanning plane is parallel to the scanning direction and the ply edges of the scanning plane are perpendicular to the scanning direction;
- moving the scanning head along the scanning direction and perpendicularly to the ply edges to scan the scanning plane of the further composite samples and obtain for each further composite sample an image of the scanning plane;
- evaluating each image to identify possible defects in the further composite samples;
- correlating the possible failures of each further testing composite components to the possible defects identified in each further composite sample machined out from a respective further testing composite components; and
- defining the acceptable threshold as a maximum number of possible defects in the further composite samples that did not give rise to failures in the respective further testing composite components.

14. The method according to claim 13, wherein the further testing composite components are any one of a fan blade, a fan casing and drive shaft of an aeroengine.

* * * * *